United States Patent [19]

Dearman

[11] Patent Number: 4,623,085
[45] Date of Patent: Nov. 18, 1986

[54] PIPE CLAMP

[76] Inventor: Timothy C. Dearman, P. O. Box 937, Pearland, Tex. 77588

[21] Appl. No.: 690,107

[22] Filed: Jan. 9, 1985

[51] Int. Cl.$^4$ .............................................. B23K 37/04
[52] U.S. Cl. ..................................................... 228/49.3
[58] Field of Search ................. 228/49.3; 269/43, 108

[56] References Cited

U.S. PATENT DOCUMENTS

| | | | |
|---|---|---|---|
| 3,901,497 | 8/1975 | Dearman | 228/49.3 |
| 3,925,854 | 12/1975 | McFadden | 228/49.3 |
| 3,944,202 | 3/1976 | Dearman | 228/49.3 |
| 4,356,615 | 11/1982 | Dearman | 228/49.3 |

Primary Examiner—Nicholas P. Godici
Assistant Examiner—G. M. Reid
Attorney, Agent, or Firm—Learman & McCulloch

[57] ABSTRACT

A pipe clamp for use in positioning a pair of pipe sections preparatory to welding them together comprises an adjustable size loop encircling one of such pipe sections and formed by a frame member and a flexible chain. The chain has a plurality of jackbar holders spaced circumferentially of the loop and each holder supports a jackbar that is adjustable axially of the loop. The frame member also supports one or more axially adjustable jackbars. Each jackbar carries at one end a jack screw that is adjustable radially of the loop so as to shift a second pipe section radially of the first pipe section for coaxial alignment of such pipe sections. The jackscrews also are capable of exerting radial forces on the pipe sections so as to conform their confronting ends. At the opposite end of each jackbar is a stablizing foot engageable with one of the pipe sections to prevent rocking of the jackbar when its jack screw bears against a pipe section. Each stabilizing foot preferably is retractable so as to enable the associated jackbar to be removed from its holder or the frame member, thereby facilitating handling of the clamp by one person.

20 Claims, 4 Drawing Figures

PIPE CLAMP

This invention relates to a pipe clamp for supporting and conforming the confronting ends of a pair of pipe sections preparatory to their being joined to one another.

BACKGROUND OF THE INVENTION

When welding pipe sections to one another to form a pipeline it is conventional to apply a circular clamp to one of the pipe sections adjacent its free end and then use such clamp to position and support an end of a second pipe section in confronting relation to the one pipe section. The clamp conventionally is equipped with a plurality of axially extending jackbars of such length as to project beyond the free end of the pipe on which the clamp is mounted and provide support for the confronting end of the second pipe. Conventionally, the jackbars include radially adjustable jack screws which are operable to shift the second pipe radially of the first pipe to a position in which the confronting ends of the pipes are substantially coaxial.

The configurations of the ends of any two pipes rarely conform to one another. In most cases the pipe ends are oval, rather than circular, and the end of one pipe is more or less oval than the other. It is necessary, therefore, not only to support the pipes so that their confronting ends are substantially coaxial, but also to reform one or both of the pipe ends so that their configurations conform. It is customary to effect conformation of the confronting pipe ends by manipulation of the jack screws. Conventionally, the jack screws bear against only one of the pipes, as a consequence of which all of the reformation is applied to only one of the pipe members, thereby resulting in the imposition of considerable stress on the clamp.

Some of the clamping devices in use are composed of a pair of arcuate, rigid frame members which together form an annulus of such size as to encircle one or both pipes that are to be joined together. These kinds of clamps generally are capable of use with pipes whose diameters vary only slightly. Such clamps, however, may have radially adjustable jack screws that can be spaced at substantially uniform distances circumferentially of the clamp so as to apply reforming forces on one or both pipes and around the entire circumference thereof. Since such clamps are capable of use only with pipes of relatively uniform diameter, however, it is necessary for the pipefitter to have multiple clamps for use with pipes of different diameters.

A clamp of the kind that is adapted for use on pipes of greatly different diameters conventionally has a frame or block which seats on one pipe and to which is secured one end of a flexible chain. The chain encircles the pipe and passes through the frame so as to form with the latter a loop having an inside diameter corresponding substantially to that of the pipe. The chain is provided with jackbars which are adjustable circumferentially of the chain loop so as to provide circumferentially spaced supports for a second pipe, and the jackbars conventionally are equipped with radially adjustable jack screws capable of clamping and reforming the confronting end of the second pipe. Although the jackbars may be adjusted circumferentially of the loop formed by the chain and block, the frame itself normally is not equipped with any means for reforming either of the two pipes. As a consequence, those portions of the pipes underlying and adjacent the frame cannot be subjected to reforming forces. Thus, it is not always possible to conform the confronting ends of the two pipes to the extent desired.

In reforming the confronting ends of two pipes it sometimes is desirable to apply reforming forces to selected areas of one pipe and reforming forces to selected areas of the other pipe. However, most of the adjustable pipe clamps utilizing flexible chains or the like have jackbars which are not sufficiently adjustable axially of the pipes to enable reforming forces to be applied to either selected one of the two pipes. Further, those jackbars which are axially adjustable require loosening of the chains to effect such adjustments.

Pipe clamps of the kind utilizing flexible chains equipped with multiple jackbars conventionally require threading of the chain through all of the jack bars prior to mounting the clamp on the pipes that are to be welded together. As a result, the weight of the clamp may be substantial and more than can be handled conveniently by one person.

It is the object of the present invention to provide a pipe clamp which overcomes all of the objectionable characteristics referred to above.

SUMMARY OF THE INVENTION

A pipe clamp constructed in accordance with the invention comprises a frame to which is secured one end of a flexible chain which may be wrapped around one pipe section adjacent one end thereof so that the chain and frame together form a loop of such size as to encircle such pipe. The size of the loop may be adjusted so as to enable a single clamp to be fitted to any one of a large number of different diameter pipes.

The chain is threaded through a plurality of jackbar holders which are adjustable circumferentially of the loop. Each jackbar holder supports a jackbar of such length as to extend axially of the loop a distance sufficient to project beyond the free end of the pipe. Each jackbar supports a jack screw that is adjustable radially of the loop. The jackbars thus are capable of providing support for one end of a second pipe and the jack screws are capable of effecting radial adjustment of the second pipe so that the end of the latter which confronts the first pipe is coaxial therewith.

The frame to which the chain is secured also is provided with one or more jackbars which, like the other jackbars, are of such length as to extend axially beyond the joint between abutting pipes. Each of these jackbars has a radially adjustable jack screw at its end.

All of the jackbars, including those carried by the frame, are adjustable axially of the loop formed by the chain and frame, thereby enabling the associated jack screws to engage either the pipe on which the clamp is mounted or the second pipe. Radial forces thus may be exerted on either or both of the pipes so as to reform their configuration.

At that end of each jackbar remote from the jack screw is a supporting foot which is engageable with the pipe on which the clamp is mounted so as to prevent rocking of the jackbar when the jack screw applies a radial force on one of the two pipes. The foot may be fixed, but preferably is movable from a projected position to a retracted position such as to enable the jackbar to be assembled with and disassembled from its associated holder at any time.

THE DRAWINGS

A preferred embodiment of a pipe clamp constructed in accordance with the invention is illustrated in the accompanying drawings, wherein.

DETAILED DESCRIPTION

Figure 1:
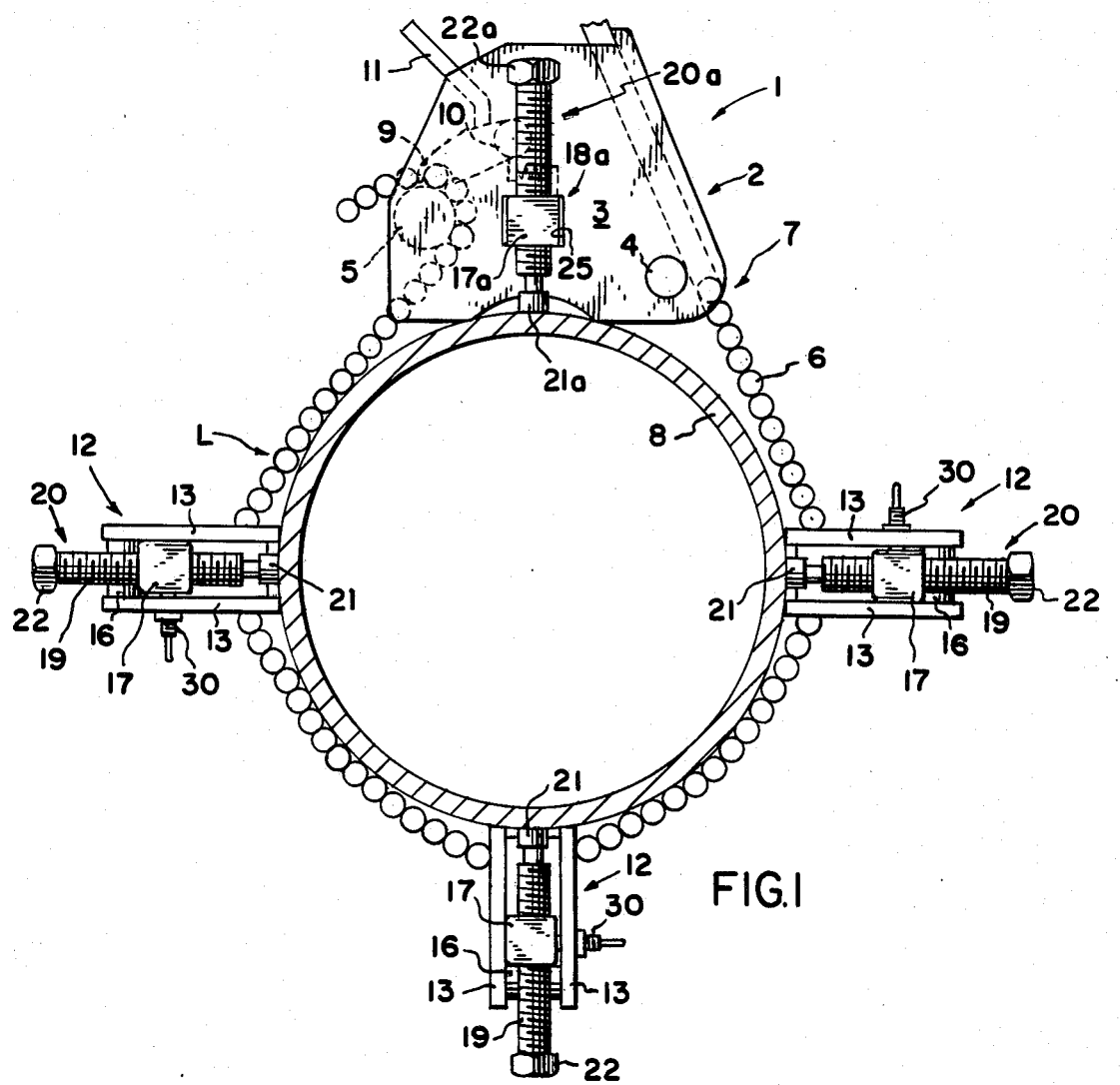
FIG. 1 is a view partly in section and partly in elevation of the clamp applied to one end of a pipe, the section being taken the line 1—1 of FIG. 2.

A pipe clamp constructed in accordance with a preferred embodiment of the invention is designated generally by the reference character 1 and comprises a main block or frame 2 composed of spaced apart, parallel plates 3 joined together by cross bars 4 and 5. The clamp also includes a flexible chain 6 one end of which is fixed to an adjusting mechanism 7 of conventional construction and which is removably supported by the frame 2. The frame 2 is adapted to be seated upon a pipe 8 adjacent one end 8a thereof and the chain 6 is adapted to be wrapped around the pipe with the free end of the chain threaded between the plates 3 of the frame and around the cross bar 5 so that the chain and frame together form a loop L. A latch dog 9 is mounted on a pivot pin 10 that spans the plates 3 of the frame 2 and has a toothed end which removably engages the chain 6 adjacent the cross bar 5 so as to secure the free end of the chain in loop-forming relation. The latch dog 9 includes a handle 11 by means of which the dog may be manipulated.

Associated with the chain 6 is a plurality of jackbar holders 12, each of which is identical and comprises a pair of spaced, parallel plates 13. Each plate has an opening 14 therein through which the chain passes, and the plates 13 are welded to and spaced apart by a U-shaped member 15 which extends around three sides of each opening 14. Corresponding ends of the plates 13 are tapered and spanned by a cross bar 16 which is spaced from the radially outer edge of the opening 14. There thus is provided between the member 15 and the cross bar 16 a space in which is slidably accommodated the elongate shank 17 of a jackbar 18.

The shank 17 of each jackbar 18 extends beyond both sides of its holder 12 and is provided at one end with a threaded opening in which is accommodated the correspondingly threaded shank 19 of a jack screw 20. Each jack screw has a swivelable pad 21 at one end and a head 22 at its other end to facilitate rotation of the jack screw.

Figure 2:
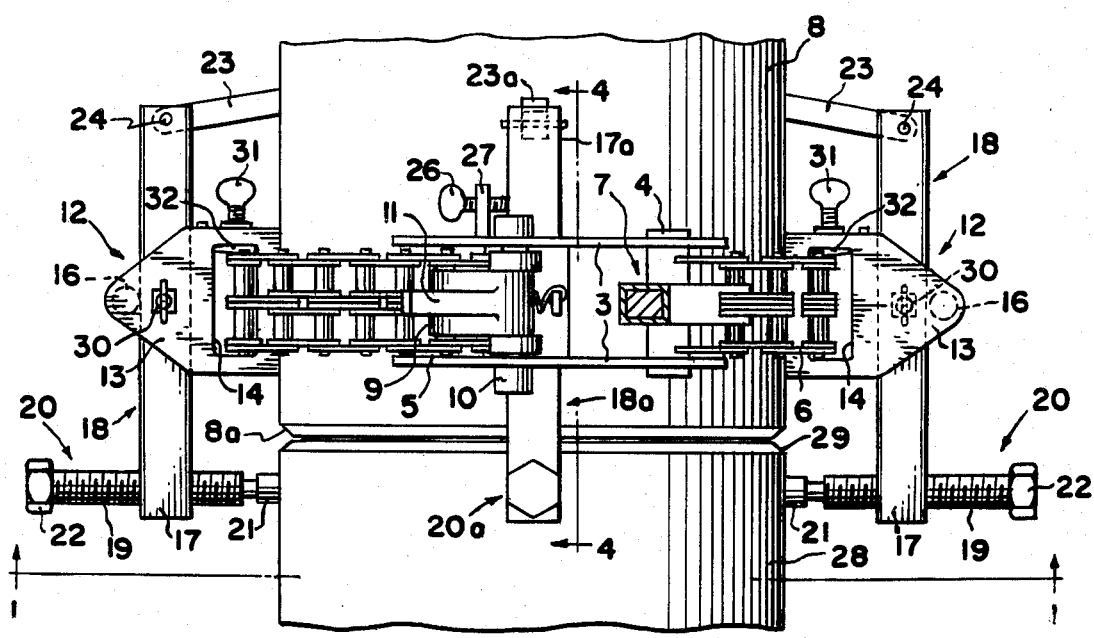
FIG. 2 is a fragmentary top plan view of the apparatus shown in FIG. 1.
Figure 3:
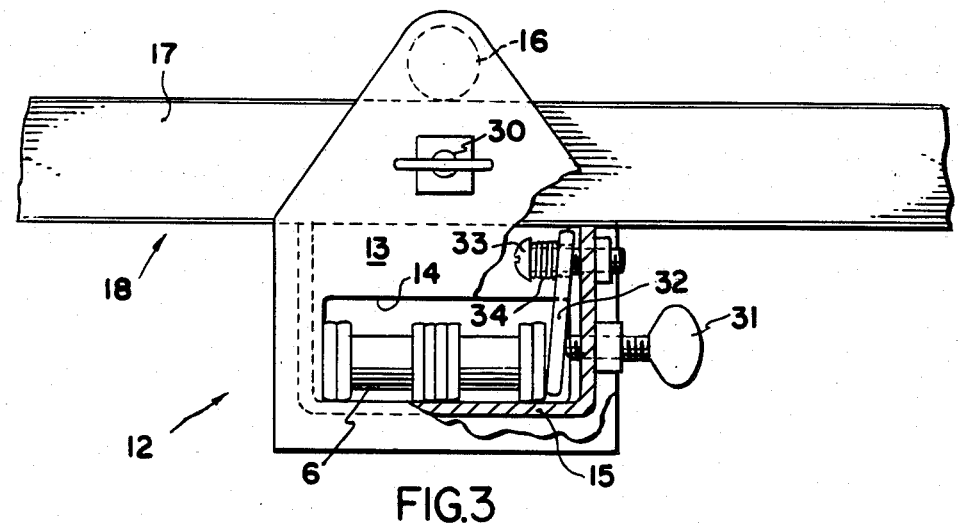
FIG. 3 is an enlarged, fragmentary, partly sectional and partly elevational view of a jackbar and jackbar holder.

At the other end of the shank of each jackbar 18 is a stabilizing foot 23 which extends generally radially of the loop L. Although each foot 23 may be fixed with respect to its associated jackbar, it is preferred that each foot be pivoted by means of a pivot pin 24 so as to be movable from a projected position as shown in FIG. 2 to a retracted position in which the jackbar may be slid out of the holder 12. The jackbar thus may be assembled with and disassembled from its associated holder 12 at any time.

The frame 2 also is provided with one or more jackbars 18a similar in all respects to the jackbars 18, with corresponding parts being identified by corresponding reference characters followed by the suffix a. The shank 17a of the jackbar 18a is slidably accommodated in aligned openings 25 formed in the plates 3 and extends beyond both ends of the frame 2. The jackbar may be maintained in any selected position of adjustment axially of the loop L by means of a retaining screw 26 which extends through the threaded opening formed in a support 27 fixed to one of the plates 3 in a position to enable the shank of the screw 26 to bear against the shank 17a of the jackbar.

To condition the apparatus for operation, the chain 6 is threaded through a suitable number of jackbar holders 12 and then around the cross bar 5 so as to form a loop L sufficiently larger than the outside diameter of the pipe 8 to enable easy adjustment of the holders 12 circumferentially of the loop. If the jackbars 18 and 18a are omitted from their respective holders at this time, the weight of the apparatus is reduced substantially, thereby facilitating movement by one person of the clamp into encircling relationship with the pipe 8 adjacent, but axially spaced from the end 8a.

Figure 4:
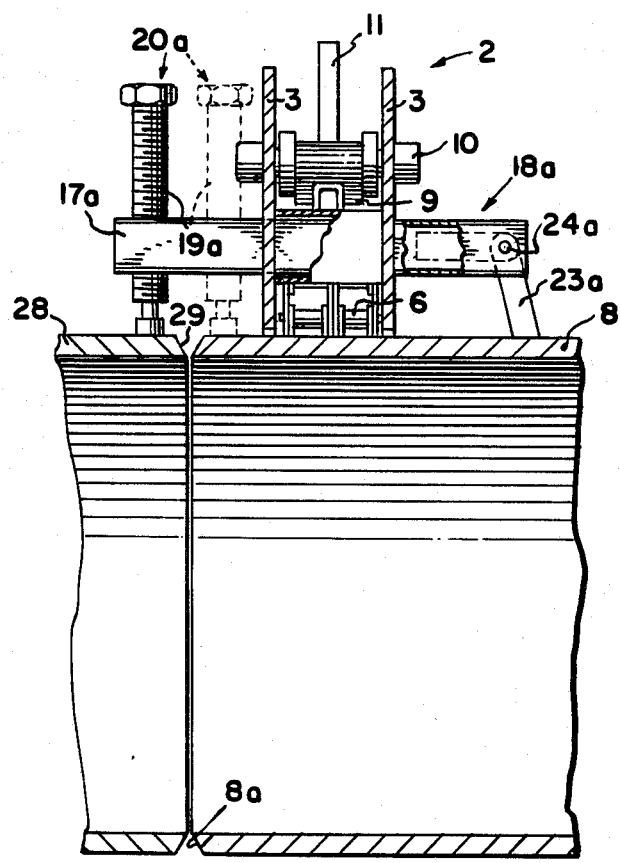
FIG. 4 is a sectional view taken on the line 4—4 of FIG. 1.

Once the loop L loosely encircles the pipe 8, the holders 12 and the frame 2 may be fitted with their respective jackbars 18 and 18a and adjusted circumferentially of the loop so that the pads 21 and 21a of the jack screws occupy positions in which they can provide support for a pipe section 28 having an end 29 that is to be welded to the end 8a of the pipe 8. Once the ends of the respective pipes are in confronting relation, the pipe fitter will be able to determine visually how the ends of the pipes must be reformed so that the confronting ends conform to one another. The holders 12 and their associated jackbars 18 then may be repositioned circumferentially of the loop L and the jackbars adjusted axially of the loop so that the respective jack screws overlie areas of the pipes which require radial compression or expansion to effect conformation of the pipe ends. Some or all of the jack screws may overlie the pipe 28, but there is sufficient distance between the chain 6 and the joint that several of the jack screws may be positioned so as to overlie the pipe 8. The jack screw 20a also may be positioned so as to overlie either of the pipes 8 or 28, as is shown in full and dotted lines in FIG. 4. Each jackbar 18 may be fixed relative to its holder by means of a retaining screw 30 engageable with the jackbar shank 17.

Once the jackbar holders 12 have been adjusted circumferentially of the loop L to the satisfaction of the pipe fitter, each holder may be fixed with respect to the chain 6 by a retaining screw 31 which extends through one leg of the member 15 for engagement with a latch plate 32 mounted on a screw 33. The plate thus may bear forcibly against the chain. A spring 34 encircles the screw and biases the latch plate 32 toward its released position. Thereafter, the fine adjustment device 7 may be manipulated so as to draw the chain 6 tightly against the pipe 8.

Following adjustment of the jackbar holders and jackbars, the jack screws 20 may be adjusted radially to bear against one or the other of the pipes 8 and 28 so as to align them axially and reshape their confronting ends so that the latter conform to one another.

Although only one jackbar 18a is shown as being mounted on the frame 2, it should be understood that more than one such jackbar can be provided in circumferentially spaced relation.

The disclosed embodiment is representative of a presently preferred form of the invention, but is intended to be illustrative rather than definitive thereof. The invention is defined in the claims.

I claim:

1. Apparatus for use in joining confronting ends of a pair of pipe sections having a joint therebetween, said apparatus comprising a frame member adapted to seat on one of said pipe sections adjacent said joint; a flexible clamp member, said frame member and said clamp member together forming a loop of such size as clampingly to encircle said one of said pipe sections; a plurality of holders carried by said clamp member at spaced intervals circumferentially of said loop; a jackbar carried by each of said holders for sliding movements axially of said loop, each of said jackbars being of such length as to extend from its holder beyond said joint, each of said jackbars having at one end thereof a stabilizing foot engageable with said one of said pipe sections and at its opposite end a jack screw movable radially of said loop into and out of forcible engagement with one of said pipe sections; at least one further jackbar slidably carried by said frame member and being of such length as to extend beyond said joint; and a jack screw carried by said further jackbar at one end thereof for movement radially of said loop, said further jackbar being slidable axially of said loop between positions in which the jack screw carried thereby is engageable with either one of said pipe sections.

2. Apparatus according to claim 1 wherein the foot of each of said jackbars is fixed.

3. Apparatus according to claim 1 wherein the foot of each of said jackbars is pivoted thereto for movements between extended and retracted positions.

4. Apparatus according to claim 3 wherein each of said jackbars is removable from its holder when its foot is in its retracted position.

5. Apparatus according to claim 1 including releasable latch means carried by each of said holders for releasably latching the latter on said clamp member in a selected position circumferentially of said loop.

6. Apparatus according to claim 1 wherein said further jackbar has a foot at its other end for engagement with said one of said pipe sections.

7. Apparatus according to claim 6 wherein said foot is fixed to said further jackbar.

8. Apparatus according to claim 6 wherein said foot is pivoted to said further jackbar for movements between extended and retracted positions.

9. Apparatus according to claim 8 wherein said further jackbar is removable from said frame member when said foot is in its retracted position.

10. Apparatus for use in joining confronting ends of a pair of pipe sections having a joint therebetween, said apparatus comprising a frame member adapted to seat on one of said pipe sections in a position spaced from said joint; a flexible clamp member secured to said frame member and forming with the latter a loop of such size as clampingly to encircle said one of said pipe sections; a plurality of jackbars; a corresponding plurality of holding means mounting said jackbars on said clamp member in circumferentially spaced relation about said loop, each of said jackbars being of such length as to extend axially of said loop beyond said joint; adjustable force applying means supported by each of said jackbars adjacent one end thereof for movements radially of said loop; a further jackbar supported by said frame member for sliding movements axially of said loop; and further force applying means supported by said further jackbar at one end thereof for movements radially of said loop, the distance of said frame member and said holding means from said joint being sufficient to enable the force applying means of any of said jackbars to engage said one of said pipe sections adjacent said joint and the length of each of said jackbars being sufficient to enable the force applying means carried thereby to extend beyond said joint and engage the other of said pipe sections.

11. Apparatus according to claim 10 including a foot carried by each of said jackbars at its other end for engagement with said one of said pipe sections.

12. Apparatus according to claim 11 wherein a selected number of said foot elements are fixed.

13. Apparatus according to claim 11 wherein a selected number of said foot elements are movable between projected and retracted positions.

14. Apparatus according to claim 10 including releasable latch means carried by each of said holding means and releasably engageable with the associated jackbars for latching the latter in a selected position of adjustment circumferentially of said loop.

15. Apparatus according to claim 10 including releasable latch means carried by each of said holding means and by said frame means and releasably engageable with the respective jackbars for latching the latter in a selected position of adjustment axially of said loop.

16. Apparatus for use in joining confronting ends of a pair of pipe sections having a joint therebetween, said apparatus comprising a frame member adapted to seat on one of said pipe sections adjacent said joint; a flexible clamp member, said frame member and said clamp member together forming a loop of such size as to encircle said one of said pipe sections; a plurality of holders, each of said holders having an opening therein through which said clamp member slideably extends to enable said holders to be adjusted circumferentially of said loop; a jackbar carried by each of said holders for sliding movements axially of said loop, each of said jackbars being of such length as to extend from its holder beyond said joint, each of said jackbars having at one end thereof a stabilizing foot engageable with said one of said pipe sections and at its opposite end force applying means movable radially of said loop into and out of forcible engagement with one of said pipe sections; and means reacting between said frame member and said clamp member to clamp the latter snugly about said one of said pipe sections, the clamping of said clamp member about said one of said pipe sections fixing said holders relative to said clamp members such that the holders cannot be moved until slack is introduced to the clamp member but having no effect on the movability of said jackbars axially of said loop.

17. Apparatus for use in joining confronting ends of a pair of pipe sections having a joint therebetween, said apparatus comprising a frame member adapted to seat on one of said pipe sections adjacent said joint; a flexible clamp member, said frame member and said clamp member together forming a loop of such size as clampingly to encircle said one of said pipe sections; a plurality of holders carried by said clamp member at spaced intervals circumferentially of said loop; a jackbar slideably carried by each of said holders and extending axially of said loop a distance to project beyond said joint, each of said jackbars having at opposite ends thereof means engageable with respective ones of said pipe sections; at least one further jackbar slideably carried by said frame member and being of such length as to extend beyond said joint; and radial force applying means at one end of said further jackbar engageable with a selected one of said pipe sections, each of said jackbars being slideable axially of said loop while the latter clampingly encircles said one of said pipe sections and between positions in which the force applying means carried thereby is engageable with a selected one of said pipe sections.

18. Apparatus according to claim 17 including latch means carried by said frame member for adjustment into and out of latching engagement with said further jackbar.

19. Apparatus for use in joining confronting ends of a pair of pipe sections having a joint therebetween, said apparatus comprising a frame member adapted to seat on one of said pipe sections adjacent said joint; a flexible clamp chain, said frame member and said chain together forming a loop of such size as tightly to encircle said one of said pipe sections; a plurality of holders carried by said chain at positions spaced circumferentially of said loop and maintained in such positions by the tightness of said chain such that the holders cannot be moved until slack is introduced to the chain; and a jackbar carried by each of said holders for sliding movements axially of said loop, each of said jackbars being of such length as to extend from its holder beyond said joint, each of said jackbars having at one end thereof a stabilizing foot engageable with said one of said pipe sections and at its opposite end force applying means movable radially of said loop into and out of forcible engagement with one of said pipe sections, each of said jackbars being slideable axially of said loop while said chain is tight and between positions in which the force applying means carried thereby is engageable with a selected one of said pipe sections.

20. Apparatus for use in joining confronting ends of a pair of pipe sections having a joint therebetween, said apparatus comprising a frame member adapted to seat on one of said pipe sections adjacent said joint; a flexible clamp chain, said frame member and said chain together forming a loop of such size as tightly to encircle said one of said pipe sections; a plurality of holders carried by said clamp member at spaced intervals circumferentially of said loop; a jackbar carried by each of said holders, each of said jackbars being of such length as to extend from its holder beyond said joint, each of said jackbars having at one end thereof a stabilizing foot engageable with said one of said pipe sections and at its opposite end force applying means movable radially of said loop into and out of forcible engagement with the other of said pipe sections; at least one further jackbar slideably carried by said frame member and being of such length as to extend beyond said joint; and a jack screw carried by said further jackbar at one end thereof for movement radially of said loop, said further jackbar being slideable axially of said loop while said chain is tight and between positions in which the jack screw carried thereby is engageable with a selected one of said pipe sections.

* * * * *